H. H. GLASIER.
METER.
APPLICATION FILED JAN. 26, 1916.

1,235,200.

Patented July 31, 1917.
4 SHEETS—SHEET 1.

Witnesses
Hugh H. Ott
Wm R. Smith

Inventor
Harold H. Glasier
by Victor J. Evans
Attorney

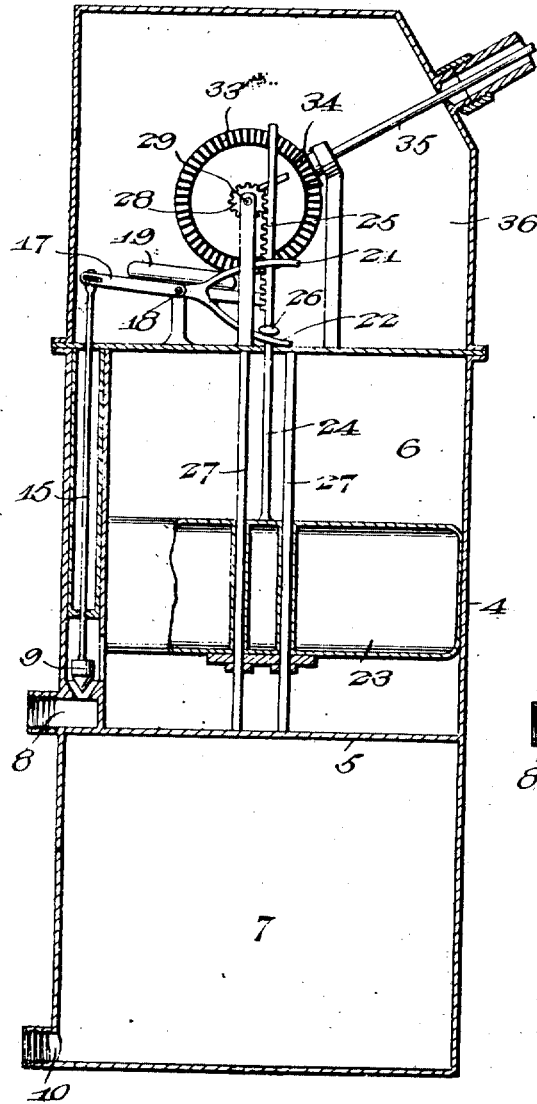
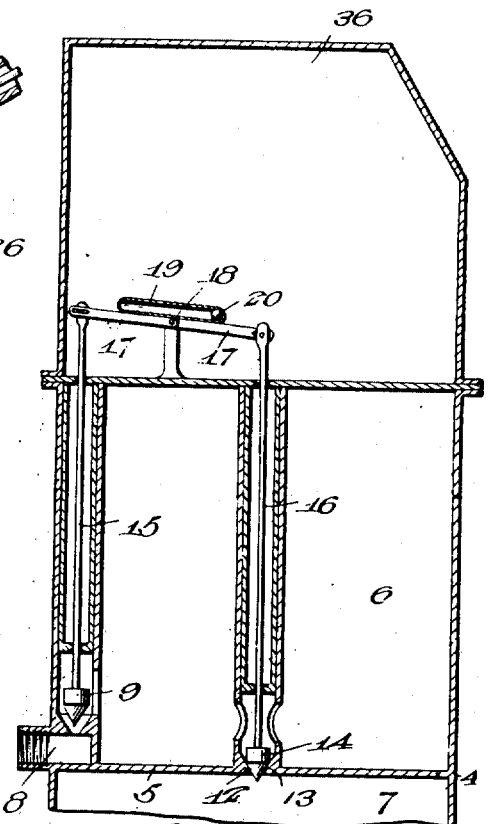
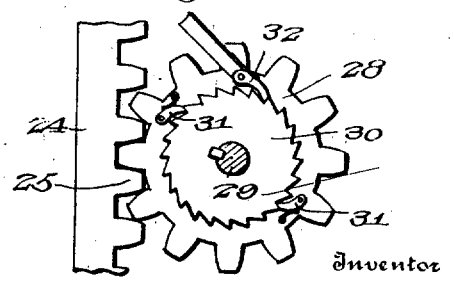

H. H. GLASIER.
METER.
APPLICATION FILED JAN. 26, 1916.

1,235,200.

Patented July 31, 1917.
4 SHEETS—SHEET 4.

Witnesses
Hugh H. Ott
Wm R. Smith

Inventor
Harold H. Glasier
By Victor J. Evans
Attorney

UNITED STATES PATENT OFFICE.

HAROLD H. GLASIER, OF OAKLAND, CALIFORNIA.

METER.

1,235,200.  Specification of Letters Patent.  Patented July 31, 1917.

Application filed January 26, 1916. Serial No. 74,444.

*To all whom it may concern:*

Be it known that I, HAROLD H. GLASIER, a citizen of the United States, residing at Oakland, in the county of Alameda and State of California, have invented new and useful Improvements in Meters, of which the following is a specification.

This invention relates to liquid meters and has for its primary object to provide a device of this character actuated by the rise and fall of a liquid, the flow of which is intermittent.

An object of the invention is to provide a meter adapted to be connected to and measure the flow of liquid to a fuel engine and indicate the amount of work performed by the engine.

My invention also contemplates the use of a pair of valves alternately operated by a liquid actuated device for allowing liquid to contact with said device and to pass out of contact with the device to a point of consumption and also means for registering the amount of liquid passing.

Besides the above, my meter is distinguished by the use of two compartments, one of which initially receives the liquid, the other of which supplies the fuel consumed, there being means provided for allowing liquid to pass from one compartment to the other and measure the amount of passing liquid.

Although I have specifically illustrated the herein preferred form which is particularly well adapted for measuring the gasolene flow to an internal combustion engine, it is to be understood that this invention is not limited to such use that the same may readily measure the flow of any liquid. With this understanding I shall describe the specific form in question and shall then explain the advantages of the invention embodied therein.

In the drawings:

Fig. 2 is a vertical section through a portion of my invention.

Fig. 3 is a vertical section to one side of the vertical section illustrated in Fig. 2.

Fig. 6 is a detail view of the gear connection between the float and the shaft of the register.

Figure 1:
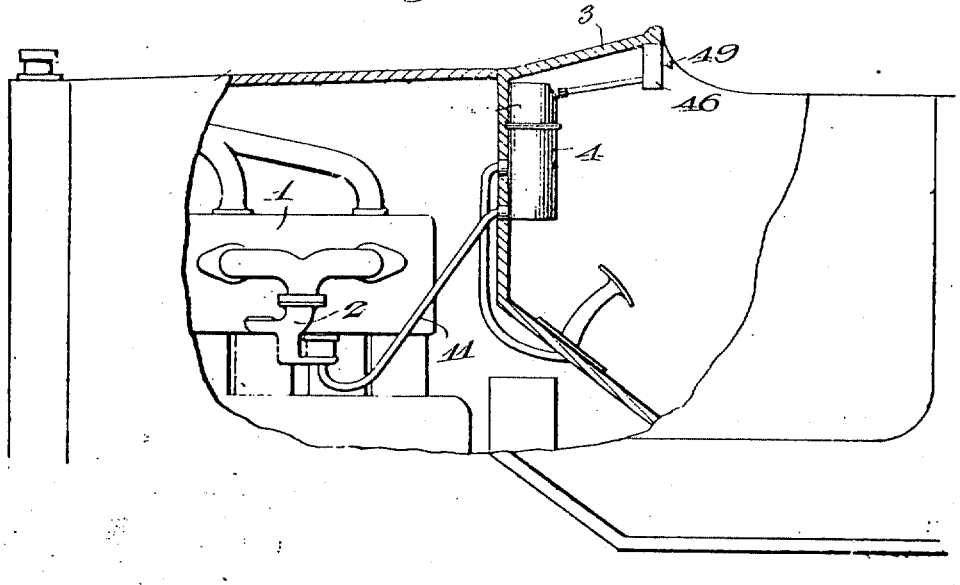
Figure 1 is a diagrammatic view of part of an automobile showing my invention applied thereto.
Figure 7:
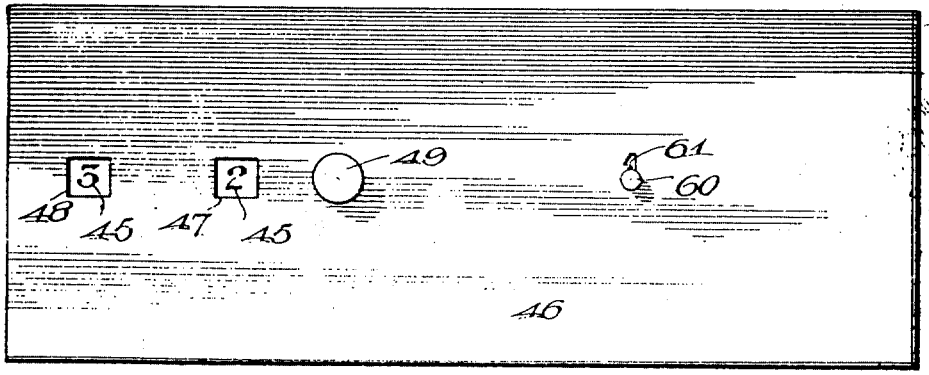
Fig. 7 is a front elevation of the register.
Figure 4:
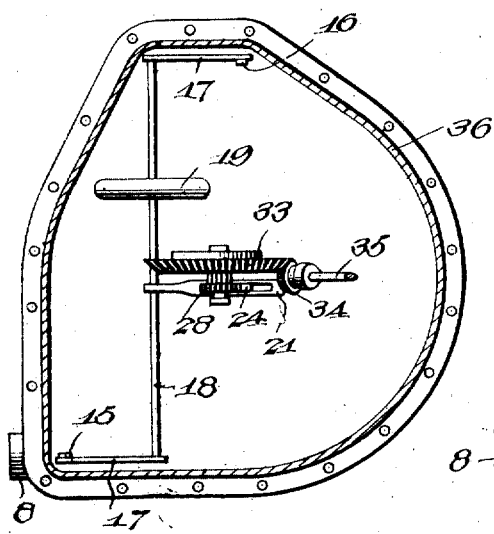
Fig. 4 is a horizontal sectional view through the hood directly above the gearing.
Figure 5:
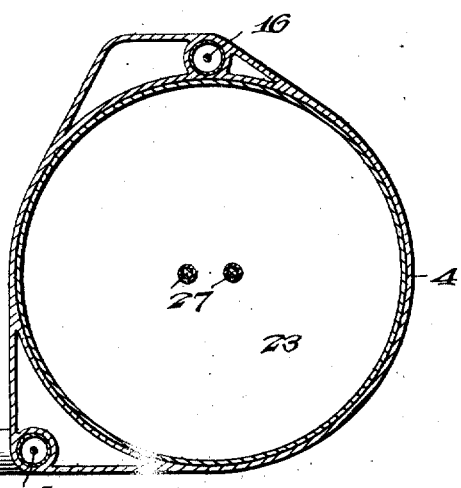
Fig. 5 is a sectional view through the casing and float.
Figure 8:
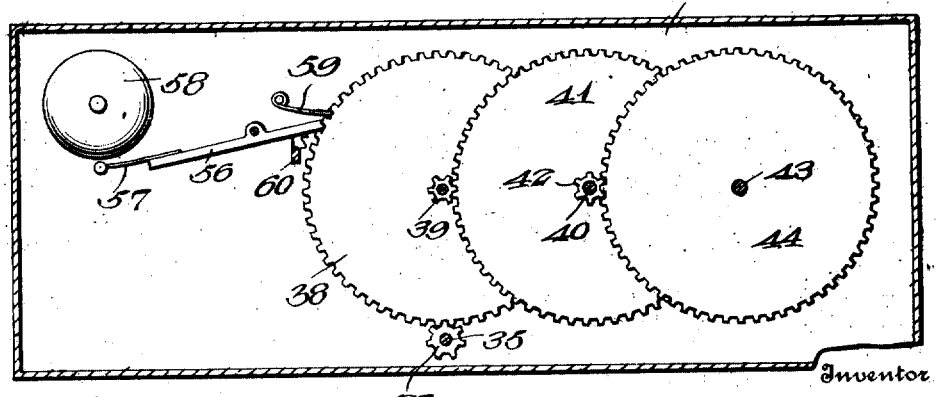
Fig. 8 is a vertical sectional view therethrough.
Figure 9:
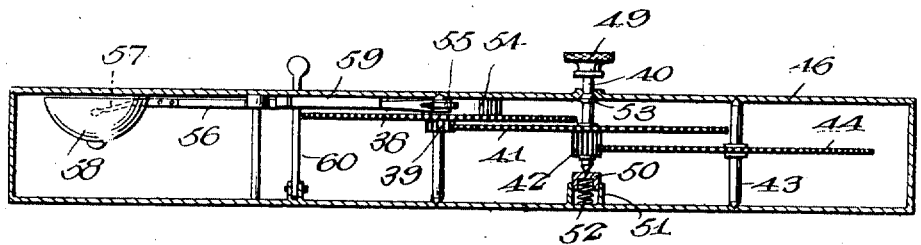
Fig. 9 is a horizontal sectional view through the registering gear train.
Figure 10:
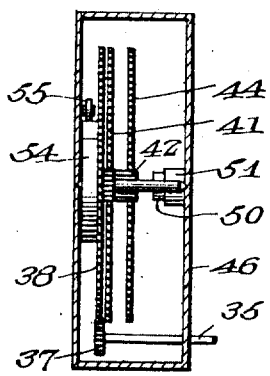
Fig. 10 is a vertical sectional view through the same.
Figure 11:
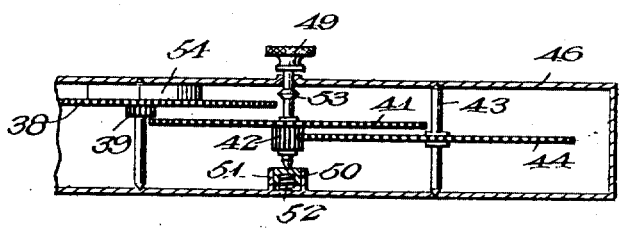
Fig. 11 is a horizontal sectional view showing one of the registering gears moved to a position to reset both registering gears.
Figure 12:
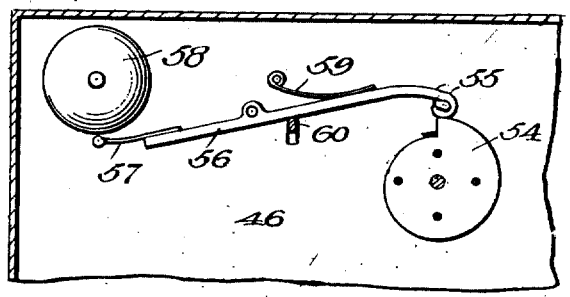
Figs. 12 and 13 are views of the signal device used with my invention.
Figure 13:
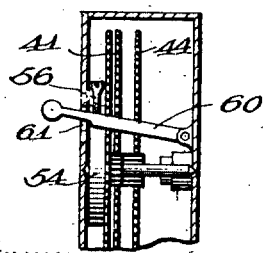

Referring to Fig. 1 it will be seen that I have shown diagrammatically an automobile of the well-known form having an internal combustion engine 1 and a carbureter 2 for feeding gas to the engine. The gasolene intake of the carbureter 2 is connected directly with my meter, and in this particular case the automobile is provided with a dashboard 3 to which the register is attached.

I will first describe the means directly operated by the liquid and then the register that is actuated by the liquid-actuated means and at this point I wish to call attention to the fact that a portion of my invention may be used with advantage in practice independently of the remaining portion of my invention, that is to say the casing with the valves and float may be used to allow predetermined amounts of liquid to pass from one compartment to the other the number of times said amount of liquid passes being accurately determined by the eye.

The numeral 4 designates a casing subdivided by means of the partition 5 into an upper compartment 6 and a lower compartment 7, the former initially receiving the liquid while the latter receives the liquid from the upper compartment and passes it to the point of consumption. The upper compartment 6 is provided with an inlet port 8, the passage of which is controlled by means of a valve 9, while the lower compartment 7 is provided with an outlet port 10 that communicates with the pipe 11 that makes direct connection with the intake of the carbureter. The partition 5 is provided with an opening 12 having a bevel wall 13 that coöperates with the valve 14. Rigidly secured to the valve 9 is a vertically arranged stem 15 while similarly connected to the valve 14 is a vertically arranged stem 16. The upper ends of these stems are pivotally connected together by means of the lever 17 pivoted to the upper surface of the partition as indicated at 18. Secured to this lever 17 is a receptacle 19 having movably mounted therein a ball 20 adapted when in one position to hold one of the valves closed and the other open and when moved to another position to reverse the condition. Rigidly secured to the lever 17 at its pivot are arms 21 and 22, each provided with a slot arranged substantially in vertical alinement, and passing through both slots and rigidly secured to a float 23 is a rod 24 having a portion of its length provided with teeth 25 for the purpose hereinafter described.

Between the arms 21 and 22 the rod has mounted thereon a collar or nut 26 which if advantageous in practice may be adjustable. The float 23 is mounted for vertical reciprocatory movement but held against lateral movement by means of the guides 27.

From the foregoing description it will be seen that when the float 23 is in its lowermost position the valve 9 will be thrown to the open position whereas the valve 14 will be thrown to the closed position. Immediately the valve 9 is raised to the open position liquid will enter through the inlet port into the upper compartment and in view of the buoyancy of the float the same will rise as the liquid rises in the upper compartment. Upon the float 23 reaching its uppermost position the positions of the valves will be reversed due to the engagement between the collar 26 and the arm 21 with the result that further income of liquid is prevented and what is in the upper compartment will flow to the lower compartment through the opening 12, with the result that the float 23 will return to its first position to again go through another cycle of operation. At this point attention is called to the fact that when the float 23 falls to its lowermost position the collar 26 engages the arm 22 for again reversing the position of the valves. From this arrangement it will be seen that should the casing be made of transparent material the amount of liquid entering the upper compartment and flowing from the upper compartment to the lower compartment can be accurately determined by the eye.

For giving a visible indication of the number of gallons used, or in other words passing from the upper compartment to the lower compartment, I will now describe my improved form of register.

The teeth 25 of the float rod engage a gear 28 loosely mounted on a shaft 29 and rigidly secured to this shaft 29 is a ratchet wheel 30. The ratchet wheel 30 is associated with the gear 28 by means of the spring-pressed pawl 31 and held against retrograde movement by means of the dog 32, or by any other suitable stationary support. Also secured to the shaft 29 is a bevel gear 33 meshing with another bevel gear 34 secured to a drive shaft 35, the latter element being inclosed by means of a hood 36 secured to the back surface of the casing. The shaft 35 also has connected thereto a gear 37 continuously in engagement with the larger gear 38 which is in turn rigidly secured to a smaller gear 39 carried upon its counter-shaft. A counter-shaft 40 has rigidly secured thereto a large gear 41 adapted to normally mesh with the gear 39 associated with the gear 41 and the smaller gear 42 adapted to continuously engage a larger gear 44 upon a counter-shaft 43. At this point attention is called to the fact that the gears 41 and 44 carry upon their faces scale marks 45 indicating the number of gallons of liquid passed. The gears are housed within a casing 46 provided with an opening 47 through which the marks on the gear 41 may be viewed and a sight opening 48 through which the marks on the gear 44 may be viewed. The shaft 43 is mounted for slidable movement and for this purpose the exteriorly arranged extremity of the shaft has secured thereto a head 49 while the remaining extremity of this shaft is tapered to a point and bears upon a cap 50 slidably mounted upon a hollow stud 51 within which is arranged a coil extension spring 52 bearing against the cap 50. The slidable movement of the shaft due to the spring 52 is limited by means of a collar 53 secured to the shaft and engaging a portion of the casing.

The signaling device for giving signals when a predetermined number of gallons of liquid has been registered comprises a cam 54 secured to the shaft 35 and arranged upon the cam surface of the cam 54 is a roller 55 carried by one end of a centrally pivoted lever 56. The remaining end of this lever has secured thereto a tapper 57 arranged to contact with the gong 58 when one end of the lever, that is, the end carrying the roller 55, is forced in a direction against the action of a spring 59. Coöperating with the lever 56 is an arm 60 in turn coöperating with a series of teeth 61 for rendering the signal system inoperative as the occasion demands.

The reciprocatory motion of the float 23 caused by the action hereinbefore set forth, will be changed to rotary motion by means of the gear 28. This rotary motion of the gear 28 will be transmitted to the shaft 29 through the former's connection with the ratchet wheel 30. From this arrangement it will be seen that the shaft is driven in one direction of travel of the gear 28 but is not moved in the reverse movement of the gear 28, thus accommodating the up-and-down movement of the float. This rotary motion is transmitted to the train of registering gears through the medium of the gears 33, 34, 37 and the shaft 35. When the registering gears 41 and 44 are to be returned to their zero positions, the countershaft 40 is given a longitudinal sliding movement by means of pressure being applied to the head 49 with the result that the gear 41 is thrown out of engagement with the gear 39, while the gear 42 continues to engage the gear 44 owing to the length of the latter. Thus it will be seen that the registering gears can be returned to the zero position without disturbing the gear 38. The signaling device is put into operation as soon as a predetermined amount of liquid has been measured by the roller 55 dropping down from the cam surface and through the resilience of the spring 59 the clapper 57 is thrown into violent contact with the gong 58.

It is to be understood that while all of the several features of my improved machine have special coöperation with one another and together constitute a particularly effective mechanism for the purpose in view, certain of these features may be applied in other relations, and I therefore desire to cover the combinations present in the several parts of my improved machine, whether employed in the general organization shown or elsewhere.

It is further to be understood that the structural embodiment of the invention as a whole and its various features as shown are merely illustrative and not restrictive, since I am well aware that many of the details of construction can be widely varied without departing from the spirit of the invention. I therefore do not desire to be limited in these particulars or in any others, except as set forth in the appended claims.

I claim:—

1. A liquid meter comprising a float so mounted as to receive reciprocatory motion by the passage of liquid, means for subjecting said float to the action of successive quantities of liquid, a rack bar secured to said float, a shaft, a gear loosely mounted thereon and engaging said bar, a second gear rigidly secured to said shaft, a dog carried by the first gear and engaging the second gear, a slidably mounted shaft, a register gear mounted upon said last mentioned shaft, a second register gear having a connection with said first register gear, and a connection between said first shaft and said first register gear whereby the first register gear may be given sliding movement for returning both register gears to zero position without giving rotary movement to the first mentioned shaft.

2. A liquid meter comprising a float so mounted as to receive reciprocatory motion by the passage of liquid, means for subjecting said float to the action of successive quantities of liquid, a rack bar secured to said float, a shaft, a gear loosely mounted thereon and engaging said bar, a second gear rigidly secured to said shaft, a dog carried by the first gear and engaging the second gear, a slidably mounted shaft, a register gear mounted upon said last mentioned shaft, a second register gear having a connection with said first register gear, a connection between said first shaft and said first register gear whereby the first register gear may be given sliding movement for returning both register gears to zero position without giving rotary movement to the first mentioned shaft, and signal means actuated upon a predetermined movement of said register gears.

3. A liquid meter comprising a float so mounted as to receive reciprocatory motion by the passage of liquid, means for subjecting said float to the action of successive quantities of liquid, a rack bar secured to said float, a shaft, a gear loosely mounted thereon and engaging said bar, a second gear rigidly secured to said shaft, a dog carried by the first gear and engaging the second gear, a slidably mounted shaft, a register gear mounted upon said last mentioned shaft, a second register gear having a connection with said first register gear, a connection between said first shaft and said register gears whereby the first register gear may be given sliding movement for returning both register gears to zero position without giving rotary movement to the first mentioned shaft, and signal means permanently associated with one of said register gears and actuated upon a predetermined movement of said register gears.

In testimony whereof I affix my signature in presence of two witnesses.

HAROLD H. GLASIER.

Witnesses:
R. D. LEWIS,
HARRY BENNER.